United States Patent [19]

Bradley

[11] 4,191,427
[45] Mar. 4, 1980

[54] SIMULATED KNOCK OFF SPINNER NUT

[75] Inventor: Robert A. Bradley, Santa Ana, Calif.

[73] Assignee: Tru-Spoke, Inc., Anaheim, Calif.

[21] Appl. No.: 919,325

[22] Filed: Jun. 26, 1978

[51] Int. Cl.² ............................................... B60B 7/06
[52] U.S. Cl. ................................... 301/108 S; 292/58; 403/14
[58] Field of Search .......... 301/108 R, 108 S, 108 A, 301/37 R, 37 S, 37 P, 37 PB, 37 TB; 292/55, 58, 212; 220/325, 327; 403/13–14; 285/404, DIG. 2

[56] References Cited

U.S. PATENT DOCUMENTS

| 1,287,000 | 12/1918 | Greaves | 220/325 X |
| 2,242,503 | 5/1941 | Baule | 220/327 X |
| 4,138,160 | 2/1979 | Lohmeyer | 301/108 S |

FOREIGN PATENT DOCUMENTS

| 55504 | 9/1912 | Fed. Rep. of Germany | 292/212 |
| 2629291 | 1/1978 | Fed. Rep. of Germany | 301/37 PB |
| 921082 | 4/1947 | France | 301/108 |

Primary Examiner—Charles A. Marmor
Attorney, Agent, or Firm—Gerald L. Price

[57] ABSTRACT

A simulated knock off wheel spinner nut which can be attached to a wheel without having to remove the wheel from the vehicle. The simulated nut is sized to be partially inserted into the hub opening of the wheel and then locked in position by a plurality of rigid tabs located about the inner circumference of the spinner nut and maintained in place by set screws with their heads accessible from the outer circumference of the nut. By tightening these screws, each tab is drawn tightly against the inside wall of the hub securing the nut to the wheel.

10 Claims, 4 Drawing Figures

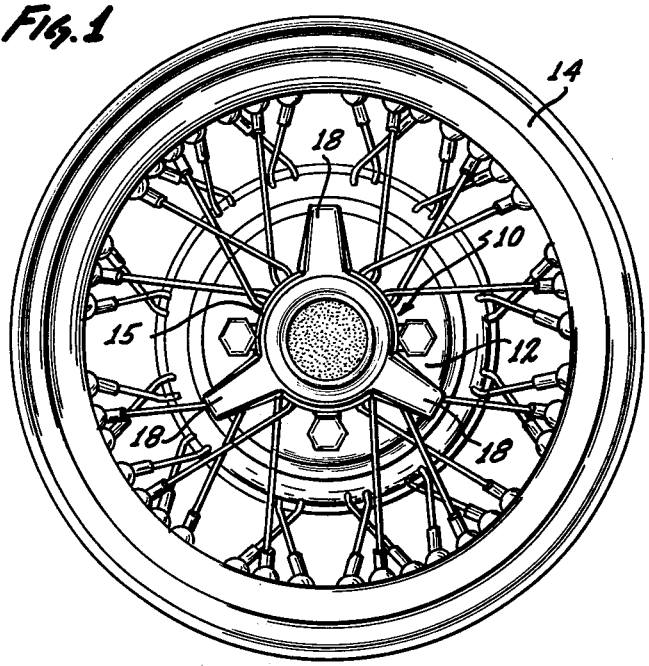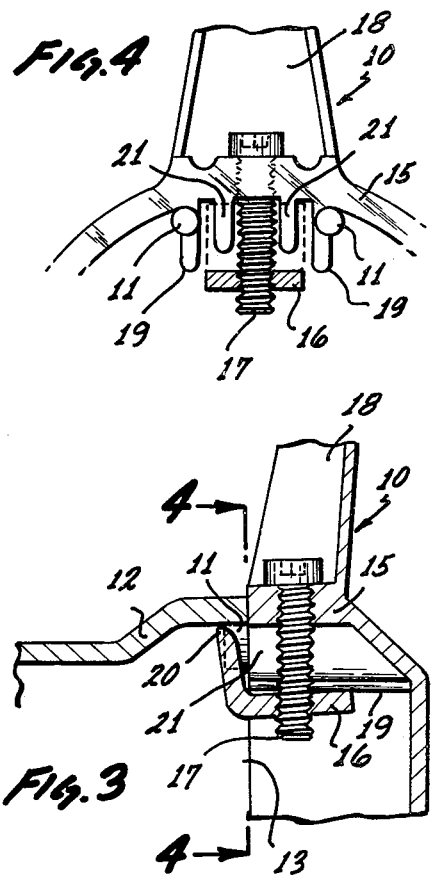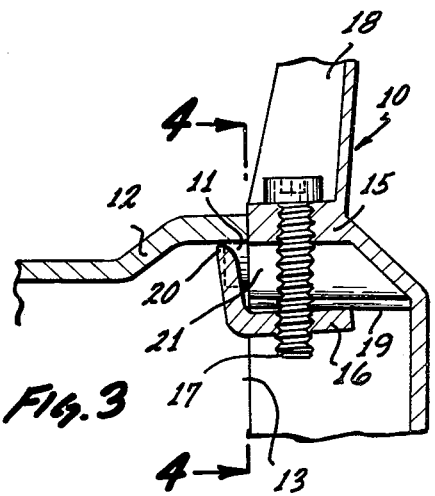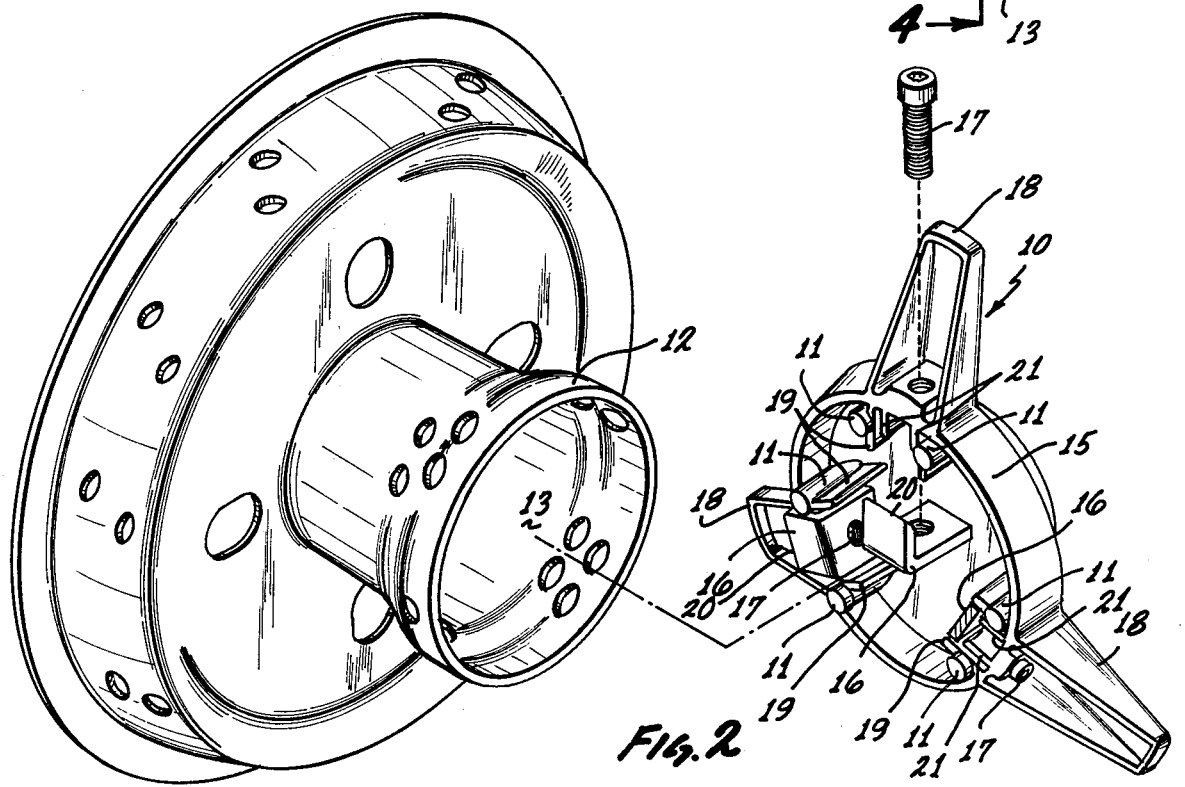

SIMULATED KNOCK OFF SPINNER NUT

BACKGROUND OF THE INVENTION

The present invention relates generally to simulated knock off wheel spinner nuts and more particularly to an improved spinner nut which enables a simulated spinner nut to be readily and permanently installed on an existing wheel without the necessity of removing the wheel from the vehicle.

Automobile wheels held in place by spinner nuts are a well known and familiar sight among racing and competition vehicles. Additionally, a number of sports cars both imported and domestic have been provided with wire wheels or light alloy wheels which are mounted on the vehicle by spinner nuts. Wheels of this type are commonly referred to as knock off wheels and a number of conventional automobiles have been provided with as original equipment hub caps employing a simulated spinner nut to impart a sporty or competition appearance to the vehicle. Additionally, simulated spinner nuthub caps and simulated spinner nut assemblies have been sold as add on automobile accessories. While a number of such products have enjoyed success, in general they do not present an authentic appearance and are readily susceptible to vandalism and theft.

A significant improvement in simulated spinner nuts is disclosed in the U.S. patent application Ser. No. 811,044, filed June 29, 1977 of Kurt W. Lohmeyer entitled Simulated Knockoff Spinner Nut and Adapter, now U.S. Pat. No. 4,138,160, which utilizes an adapter which is securely affixed to the wheel which in turn threadably receives the spinner nut. While this arrangement is realistic and a significant improvement over the prior art, the adapter and nut assembly is costly to produce and presents the possibility of the nut being removed from the adapter by theft or vibration.

SUMMARY OF THE INVENTION

Accordingly, it is the general aim of the present invention to provide a new and improved simulated spinner nut which is far more realistic in appearance, easier to install and is more economical to produce than has heretofore been possible. A related object of the invention is to provide an improved simulated spinner nut which can be securely affixed to a mounted vehicle wheel without the necessity of removing the wheel from the vehicle. A still further object of the invention is to provide a simulated spinner nut for a vehicle wheel which is highly resistant to vandalism and theft.

While the present invention is concerned with the provision of a new and improved simulated spinner nut and adapter, it is nevertheless, an object of the invention to provide an improved simulated spinner nut and mounting adapter which is made of a minimum of parts thus simplifying the manufacturing and packaging together with the installation of same.

BRIEF DESCRIPTION OF THE DRAWINGS

Other objects and advantages of the present invention, along with the interrelationship between the elements of the preferred embodiment, will become more apparent when considered in connection with the specification and accompanying drawings in which:

FIG. 1 is a side elevation of an exemplary simulated wheel spinner embodying the features of the present invention mounted on a spoked vehicle wheel;

FIG. 2 is a rear exploded perspective view of the simulated spinner nut of the present invention together with the hub portion of a vehicle wheel;

FIG. 3 is an enlarged fragmentary section of the spinner nut and vehicle hub illustrated in FIGS. 1 and 2 showing the nut secured to the hub; and FIG. 4 is an enlarged fragmentary rear section of the spinner nut of the present invention taken generally along 4—4 of FIG. 3.

While the present invention is susceptible of various modifications and alternative constructions and can be used with various types of materials and overall designs, illustrative embodiments are shown in the drawings and will hereinafter be described in detail. It should be understood, however, that it is not intended to limit the invention to the particular embodiment disclosed, but, on the contrary, the intention is to cover all equivalents and alternative constructions falling within the spirit and scope of the invention as expressed in the appended claims.

DESCRIPTION OF THE PREFERRED EMBODIMENT

Referring now to FIGS. 1 and 2, an exemplary simulated spinner nut generally indicated at 10, is illustrated. For the purposes of illustration, the simulated spinner nut of the present invention is shown in use with a vehicle wheel 14 of the type which is the subject of U.S. Pat. No. 241,421 De. This wheel is a wire wheel construction which is bolted to the vehicle in the same manner as a conventional automobile wheel.

In accordance with one of the important aspects of the present invention, provision is made for mounting the simulated spinner nut 10 on the wheel 14. This is accomplished by providing three sets of projections 11 about the rear side of the nut 10 which are spaced to allow the nut to be slidably inserted partially into the opening 13 of the hub portion 12 of the wheel 14 so that the shoulder portion 15 of the nut 10 abutts the hub 12 as shown in FIGS. 2 and 3.

As best shown in FIGS. 2 and 3, the spacing of the projections 11 form a circular configuration with an outside diameter just less than the inside diameter of the hub opening 13 of the hub portion 12.

In order to secure the simulated spinner nut 10 in place after it is inserted into the opening 13 of the hub portion, 12, a plurality of tabs 16 are provided in equal spacing about the inside of the nut 10. As shown in FIGS. 2, 3 and 4, each tab 16 is of an L shape cross section and threadably receive a screw 17 which passes through the shoulder 15 of the nut 10 with the head of each screw 17 located behind one of the wings 18 of the nut 10. Each tab is maintained in forward alignment and prevented from turning when screw 17 is tightened by a pair of guide walls 19 extending downwardly from each pair of projections 11 and accordingly, when each screw 17 is tightened, the tab 16 that it is screwed through, will be drawn upwardly between its respective pair of guide walls 19. As can be readily seen by referring collectively to FIGS. 2 through 4, when the simulated spinner nut 10 is inserted into the hub opening 13 of wheel hub 12, the successive tightening of each screw 17 will draw its respective tab 16 upwardly so that its leading edge 20 will tightly abut the inside surface of hub 12 thereby firmly securing spinner nut 10 to wheel 14. To insure that the leading edge 20 firmly abuts the hub, a second pair of walls 21 are provided within guide walls 19 to provide a flat support for the horizontal leg of tab 16 when it is tightened with its forward edge 20 abutting the inner surface of the hub.

In order to prevent theft of the spinner nut 10, a set screw requiring an unconventional type of screwdriver or wrench can be utilized in place of screws 17 to increase the difficulty of unauthorized removal.

Having thus described my invention, I claim:

1. For use with a vehicle wheel of the type having a circular hub opening including a generally axially smooth interior sidewall surface portion, a simulated knock off wheel spinner nut comprising:
   a. a simulated spinner nut having a first portion of a generally cylindrical cross section and having mounting means for axially aligning the spinner nut relative to the hub opening and being sized to be slidably inserted into the circular hub opening of the vehicle wheel for partially receiving the nut within the hub opening; and
   b. means for securing said spinner nut to the vehicle wheel comprising a plurality of tabs spaced about the inner circumference of said first portion each having a screw threadably inserted therein with said screw passing through said first portion of said spinner nut and having its head outside thereof for drawing each of said tabs radially outwardly into frictional locking engagement with the interior sidewall surface of the circular hub opening of the wheel.

2. The apparatus as set forth in claim 1 wherein said spinner nut is provided with a plurality of wings with the head of each of said screws being located behind each said wing.

3. The apparatus as set forth in claim 1 wherein said mounting means comprises a plurality of pairs of projections spaced about the circumference of said spinner nut and extending axially outwardly therefrom.

4. The apparatus set forth in claim 3 further including a pair of guide walls for each said tab to prevent said tabs from turning when their respective screws are being tightened to draw them radially outwardly, each said pair of guide walls extending radially inwardly from the inside surface of said spinner nut and adjacent to each respective tab and spaced sufficiently apart to allow said tab to fully move radially outwardly therein.

5. The apparatus set forth in claim 4 wherein each said tab is of an L shape with its respective screw inserted in its axial leg and with its radial leg abutting the inside interior sidewall surface of the wheel hub when said screw is fully tightened.

6. The apparatus set forth in claim 5 wherein support means is provided for the axial leg of each said tab when it is drawn up to a position when the radial leg of said tab abuts the wheel hub.

7. The apparatus set forth in claim 6 wherein said support means comprise a pair of radial walls disposed between each said pair of guide walls.

8. The apparatus set forth in claim 7 wherein said guide walls are integral with said projections and depend radially inwardly therefrom.

9. The apparatus set forth in claim 8 wherein the head of each said screw is behind one of the wings of said spinner nut so that they will not be readily visible when the spinner nut is operatively positioned.

10. The apparatus set forth in claim 9 wherein there are at least three of said tabs.

* * * * *